US012794593B2

(12) United States Patent
Ozan et al.

(10) Patent No.: US 12,794,593 B2
(45) Date of Patent: Nov. 10, 2026

(54) SOFT HARQ SCHEMES, SIGNALING METHODS AND REPORTING GRANULARITY IN MOBILE COMMUNICATIONS

(71) Applicant: MediaTek Singapore Pte. Ltd., Singapore (SG)

(72) Inventors: Waseem Hazim Ozan Ozan, Cambridge (GB); Jozsef Gabor Nemeth, Cambridge (GB); Mohammed S Aleabe Al-Imari, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 663 days.

(21) Appl. No.: 18/265,429

(22) PCT Filed: Dec. 7, 2021

(86) PCT No.: PCT/CN2021/135999
§ 371 (c)(1),
(2) Date: Jun. 5, 2023

(87) PCT Pub. No.: WO2022/127645
PCT Pub. Date: Jun. 23, 2022

(65) Prior Publication Data

US 2024/0031071 A1 Jan. 25, 2024

Related U.S. Application Data

(60) Provisional application No. 63/125,422, filed on Dec. 15, 2020.

(51) Int. Cl.

| | |
|---|---|
| ***H04L 1/1812*** | (2023.01) |
| ***H04L 1/00*** | (2006.01) |
| ***H04W 72/1273*** | (2023.01) |

(52) U.S. Cl.
CPC .......... *H04L 1/1812* (2013.01); *H04L 1/0003* (2013.01); *H04W 72/1273* (2013.01)

(58) Field of Classification Search
CPC ... H04L 1/1864; H04L 1/1825; H04L 1/1854; H04L 1/0015; H04L 1/0003; H04L 1/0009; H04L 1/1671; H04L 1/1861
See application file for complete search history.

(56) References Cited

U.S. PATENT DOCUMENTS

2012/0320853 A1 12/2012 Kwon et al.
2018/0131428 A1 5/2018 Chen et al.
(Continued)

FOREIGN PATENT DOCUMENTS

CN 107771380 A 3/2018
WO WO 2017041288 A1 3/2017

OTHER PUBLICATIONS

European Patent Office, Extended European Search Report in European Patent Application No. 21905574.6, Oct. 1, 2024.
(Continued)

*Primary Examiner* — Romani Ohri
(74) *Attorney, Agent, or Firm* — Andy M. Han; Han IP PLLC

(57) ABSTRACT

Various examples pertaining to soft hybrid automatic repeat request (HARQ) schemes, signaling methods and reporting granularity in mobile communications are described. An apparatus, implementable in a user equipment (UE), receives a transmission from a network node. In response to receiving the transmission, the apparatus generates a soft HARQ. The apparatus then transmits the soft HARQ to the network node. In generating the soft HARQ, the apparatus selects a measurement method, a metric and a reporting granularity. Accordingly, the apparatus generates the soft
(Continued)

HARQ using the selected measurement method, the selected metric and the selected reporting granularity.

16 Claims, 8 Drawing Sheets

(56) References Cited

U.S. PATENT DOCUMENTS

| | | | | |
|---|---|---|---|---|
| 2020/0169962 | A1* | 5/2020 | Fakoorian | H04L 1/1858 |
| 2022/0116157 | A1* | 4/2022 | Papasakellariou | H04L 1/1664 |
| 2023/0379916 | A1* | 11/2023 | Yin | H04L 1/1854 |

OTHER PUBLICATIONS

Qualcomm Incorporated: "CSI enhancement for IOT and URLLC", 3GPP Draft; R1-2009258, 3GPP, vol. RAN WG1, No. e-Meeting; Oct. 26-Nov. 13, 2020, Oct. 24, 2020 (Oct. 24, 2020), XP051946921.

Li et al: "Advanced Massive MIMO and Power Saving Techniques for 5G and Beyond", Thesis, Department of Electrical and Electronic Engineering, the University of Hong Kong, HK, pp. 1-219, Aug. 31, 2020 (Aug. 31, 2020), XP009544019.

ZTE et al: "Aperiodic CSI for NR MIMO", 3GPP Draft; R1-1608693 Aperiodic CSI for NR MIMO, 3GPP, vol. RAN WG1, No. Lisbon, Portugal; Oct. 10-Oct. 14, 2016, Oct. 9, 2016 (Oct. 9, 2016), XP051148751.

ZTE: "CSI Feedback Enhancements for MUST", 3GPP TSG RAN WG1 Meeting #83, R1-156633, Anaheim, USA, Nov. 15-22, 2015.

ZTE: "Aperiodic CSI for NR MIMO", 3GPP TSG RAN WG1 Meeting #86, R1-1608693, Liston, Portugal, Oct. 10-14, 2016.

Qualcomm Incorporated: "CSI enhancement for IOT and URLLC", 3GPP TSG RAN WG1 #103-e, R1-2009258, e-Meeting, Oct. 26-Nov. 13, 2020.

China National Intellectual Property Administration, 1st Office Action in China Application No. 202180083874.6, Jun. 24, 2025.

ZTE: "Aperiodic CSI for NR MIMO", 3GPP TSG RAN WG1 Meeting #86, R1-1608693, Lisbon, Portugal, Oct. 10-14, 2016.

* cited by examiner

300

| Map | Soft HARQ |
|---|---|
| 00 | Delta BLER exponent ≤ 0 |
| 01 | Delta BLER exponent = 1 |
| 10 | Delta BLER exponent = 2 |
| 11 | Delta BLER exponent ≥ 3 |

FIG. 3

400

| Map | Soft HARQ | Mapped Information |
|---|---|---|
| 00 | High-ACK | Delta BLER exponent ≤ 1 + ACK |
| 01 | Low-ACK | Delta BLER exponent ≥ 2 + ACK |
| 10 | Low-NACK | Delta BLER exponent ≤ 1 + NACK |
| 11 | High-NACK | Delta BLER exponent ≥ 2 + NACK |

FIG. 4

500

| Map | Mapped Information |
|---|---|
| 00 | Inter-Cell Interference |
| 01 | Fading Channel Effects |
| 10 | Beam Blockage |
| 11 | Other Effects |

| Map | Mapped Information |
|---|---|
| 00 | Delta BLER exponent ≤ 0 |
| 01 | Delta BLER exponent = 1 |
| 10 | Delta BLER exponent = 2 |
| 11 | Delta BLER exponent ≥ 3 |

FIG. 5

600

| MAP | SOFT HARQ | MAPPED INFORMATION |
|---|---|---|
| 00 | HIGH-ACK | DELTA BLER EXPONENT ≤ 1 + ACK |
| 01 | LOW-ACK | DELTA BLER EXPONENT ≥ 2 + ACK |
| 10 | INTER-CELL-NACK | INTER-CELL INTERFERENCE + NACK |
| 11 | FADING-NACK | FADING CHANNEL EFFECTS + NACK |

FIG. 6

SOFT HARQ SCHEMES, SIGNALING METHODS AND REPORTING GRANULARITY IN MOBILE COMMUNICATIONS

CROSS REFERENCE TO RELATED PATENT APPLICATION

The present disclosure is part of U.S. National Stage filing of International Patent Application No. PCT/CN2021/135999, filed 7 Dec. 2021, which is part of a non-provisional application claiming the priority benefit of U.S. Patent Application No. 63/125,422, filed on 15 Dec. 2020, the content of which being incorporated by reference in its entirety.

TECHNICAL FIELD

The present disclosure is generally related to mobile communications and, more particularly, to soft hybrid automatic repeat request (HARQ) schemes, signaling methods and reporting granularity in mobile communications.

BACKGROUND

Unless otherwise indicated herein, approaches described in this section are not prior art to the claims listed below and are not admitted as prior art by inclusion in this section.

In wireless communications, such as mobile communications under the 3rd Generation Partnership Project (3GPP) specification(s) for 5th Generation (5G) New Radio (NR), downlink (DL) HARQ typically refers to the transfer of DL data on a physical downlink shared channel (PDSCH) with HARQ acknowledgements returned on either a physical uplink control channel (PUCCH) or a physical uplink shared channel (PUSCH). A user equipment (UE) reports an acknowledgement (ACK) to a base station (e.g., gNB) upon successful PDSCH decoding or the UE reports a negative acknowledgement (NACK) otherwise.

An outer loop link adaptation (OLLA) may be implemented at the gNB to maintain a desired block error ratio (BLER). A typical operation by a gNB is to increase a backoff duration with a certain value upon NACK reception. This can result in a reduced effective signal-to-interference-and-noise ratio (SINR) that is used for modulation coding scheme (MCS) selection, thus resulting in a lower MCS selection. The gNB may operate similarly to decrease the backoff duration upon ACK reception. Depending on the desired BLER, the ratios of ACK and NACK adjustments can be varied. The OLLA may work well for initial transmission with an error rate target of about 20% with a target BLER equal to 0.2 (e.g., for enhanced mobile broadband (eMBB)). However, in ultra-reliable low-latency communication (URLLC) with a low target BLER, there may not be enough NACK events for the outer loop of OLLA to converge. One way to utilize OLLA is to make the outer loop act on events before those events lead to a block error. This may be achieved by sending soft HARQ. Therefore, there is a need for a solution of soft HARQ schemes, signaling methods and reporting granularity in mobile communications.

SUMMARY OF THE INVENTION

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions involving soft HARQ schemes, signaling methods and reporting granularity in mobile communications.

In one aspect, a method may involve receiving a transmission from a network node. The method may also involve generating a soft HARQ. The method may further involve transmitting the soft HARQ to the network node. In generating the soft HARQ may involve selecting a measurement method, a metric and a reporting granularity. Additionally, the method may involve generating the soft HARQ using the selected measurement method, the selected metric and the selected reporting granularity.

In another aspect, an apparatus may include a transceiver and a processor coupled to the transceiver. The transceiver may be configured to communicate wirelessly. The processor may be configured to receive, via the transceiver, a transmission from a network node, generate a soft HARQ, and transmit, via the transceiver, the soft HARQ to the network node. In generating the soft HARQ, the processor may select a measurement method, a metric and a reporting granularity. Accordingly, the processor may generate the soft HARQ using the selected measurement method, the selected metric and the selected reporting granularity.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a diagram of an example design under a proposed scheme in accordance with the present disclosure.

FIG. 4 is a diagram of an example design under a proposed scheme in accordance with the present disclosure.

FIG. 5 is a diagram of an example design under a proposed scheme in accordance with the present disclosure.

FIG. 6 is a diagram of an example design under a proposed scheme in accordance with the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to soft HARQ schemes, signaling methods and reporting granularity in mobile communications. According to the present disclosure, a number of possible solutions may be implemented separately or jointly. That is, although these possible solutions may be described below separately, two or more of these possible solutions may be implemented in one combination or another.

Figure 1:
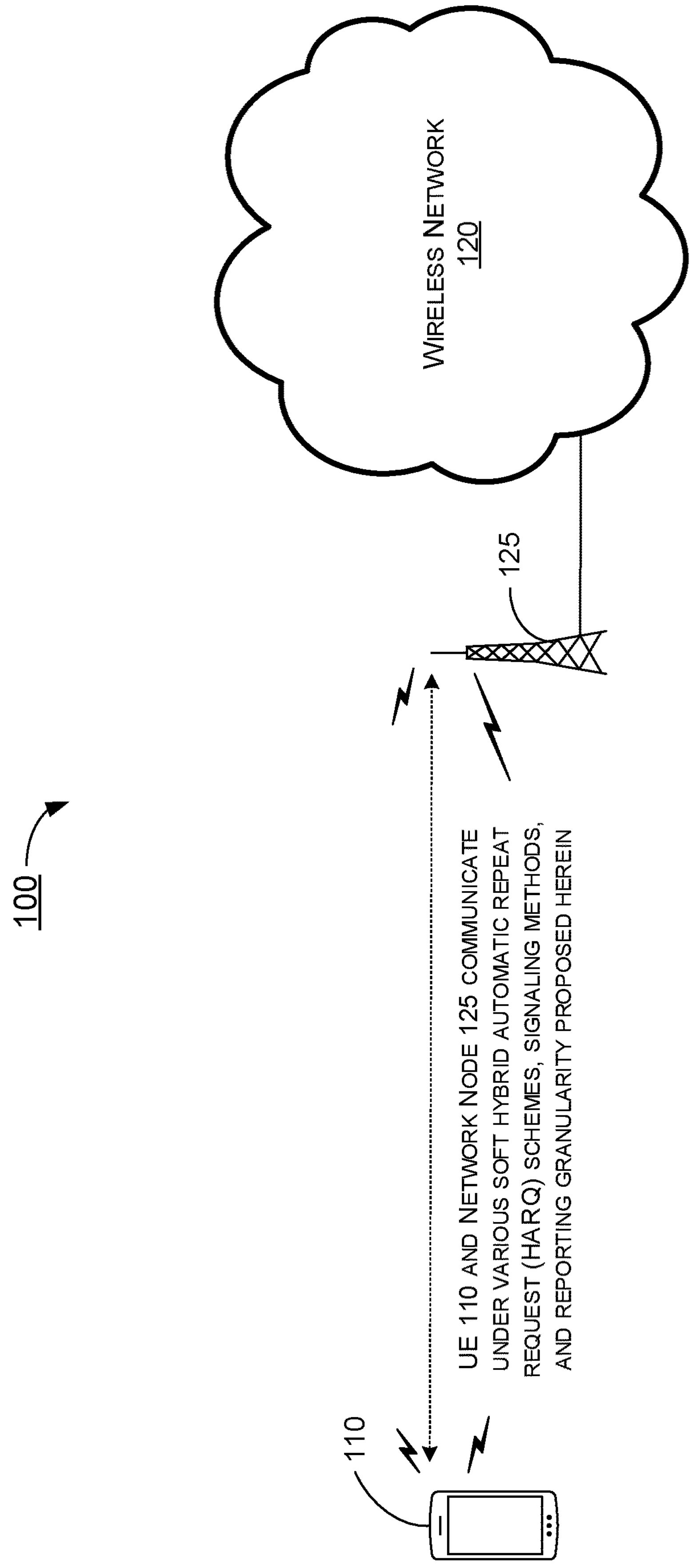
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network or another type of network such as an NTN). UE 110 may be in wireless communication with wireless network 120 via a base station or network node 125 (e.g., an eNB, gNB or transmit-receive point (TRP)). In network environment 100, UE 110 and wireless network 120 (via network node 125) may implement various schemes pertaining to soft HARQ schemes, signaling methods and reporting granularity in mobile communications, as described below.

Figure 2:
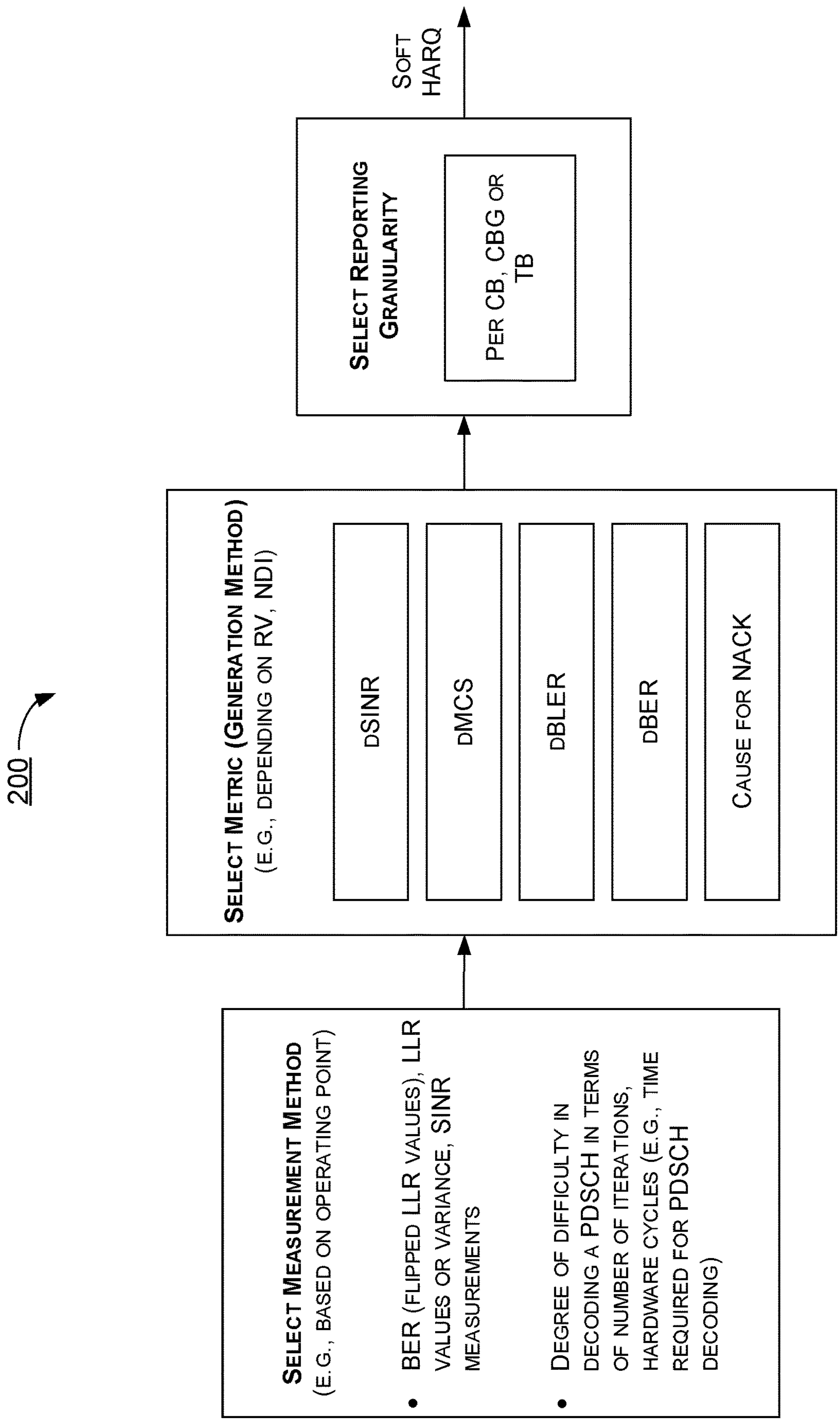
FIG. 2 is a diagram of an example design under a proposed scheme in accordance with the present disclosure.

FIG. 2 illustrates an example design 200 under a proposed scheme in accordance with the present disclosure. Under various proposed schemes of the present disclosure, a process involving a number of operations may be executed in generating and reporting a soft HARQ. Referring to FIG. 2, a measurement method may be selected, a metric may then be selected, and a reporting granularity may also be selected. Then, UE 110 may generate and report a soft HARQ to network node 125 using the selected measurement method, the selected metric, and the selected reporting granularity.

The selection of measurement method may be based on the operating point. For instance, the measurement method may be selected based on a bit error rate (BER) according to flipped log-likelihood ratio (LLR) values or variances or SINR measurements. Alternatively, the measurement method may be selected based on a degree of difficulty in decoding a PDSCH according to, for example and without limitation, a number of iterations and hardware (HW) cycles (e.g., time required for PDSCH decoding). The metric for generation method may be selected depending on a redundancy version (RV) or new data indicator (NDI). For instance, the metric for generating a soft HARQ feedback/report may be based on an estimated SINR or a delta SINR (denoted as "dSINR" in FIG. 2), an estimated MCS or delta MCS (denoted as "dMCS" in FIG. 2), an estimated BLER or delta BLER (denoted as "dBLER" in FIG. 2), an estimated BER or delta BER (denoted as "dBER" in FIG. 2), or a cause for NACK. Moreover, the generation may utilize a packet MCS and a configured reference (e.g., per RV or NDI) or a previous (or another) packet (or transmission of the same packet) as reference. The reporting granularity may be selected per code block (CB), code block group (CBG), or per transport block (TB).

It is noteworthy that the various proposed schemes described below may be categorized, based on the source of information, into: (a) soft HARQ based on the degree of difficulty as in whether PDSCH decoding is successful or unsuccessful, and (b) soft HARQ based on the estimated SINR information. For soft HARQ based on the degree of difficulty, reporting may be based on either or both of the following: (i) a delta MCS and (ii) an estimated BLER or delta BLER. For soft HARQ based on the estimated SINR information, reporting may be based on one or more of the following: (i) an actual SINR reading and/or variation, (ii) MCS values or variation, and (iii) the estimated BLER or delta BLER.

Under a first proposed scheme in accordance with the present disclosure, UE 110 may report soft HARQ to network node 125 based on a degree of difficulty as in whether PDSCH decoding is successful or unsuccessful. Under the proposed scheme, UE 110 may determine the difficulty in decoding a PDSCH based on the time required to complete the decoding process. For instance, the time required to achieve a successful cyclic redundancy check (CRC) measured in HW cycles may be used in determining the difficulty in PDSCH decoding. Alternatively, or additionally, UE 110 may determine the difficulty in decoding the PDSCH based on one or more LLR values and/or variances. Alternatively, or additionally, UE 110 may determine the difficulty in decoding the PDSCH based on any change in a number of flipped bits before and after low-density parity-check (LDPC) decoding.

Under a second proposed scheme in accordance with the present disclosure, UE 110 may report soft HARQ to network node 125 based on a delta MCS. Different options may be applied or otherwise configured to determine the delta MCS. In a first option (Option 1), the delta MCS may be defined as a difference between the following: (1) an estimated MCS value of a PDSCH based on a reference, specific or configured BLER (or BER) and (2) an MCS used for the PDSCH transmission (which may be deemed an MCS reference). For instance, to determine the delta MCS, UE 110 may first determine the estimated MCS of the PDSCH and then compare it to the MCS used for the PDSCH transmission. The delta MCS may be defined or expressed as follows: delta MCS=MCS used for the PDSCH transmission−MCS estimated.

In a second option (Option 2), the delta MCS may be defined as a difference of the estimated MCS value between two PDSCHs for a given specific BLER (or BER). For instance, to determine the delta MCS, UE 110 may first determine the estimated MCS of the PDSCH and compare it to the estimated MCS of a previous PDSCH. The MCS offset may be defined or expressed as follows: MCS offset=estimated MCS of a transmission−estimated MCS of a previous transmission.

In a third option (Option 3), the delta MCS may be defined based on a difference in LLR quality values of a currently received PDSCH and a previously received PDSCH. Under the proposed scheme, UE 110 may determine the delta MCS for a given specific BLER (or BER). Alternatively, UE 110 may determine the delta MCS without a given BLER (or BER). For instance, UE 110 may determine the LLR values/variances for a given PDSCH to compare to the LLR values/variances of a previously received PDSCH, then the LLR quality value difference may be mapped to the delta MCS.

Under the proposed scheme, UE 110 may determine the estimated MCS value based on LLR values and/or variances. Alternatively, or additionally, UE 110 may determine the estimated MCS value based on a change in a number of flipped bits before and after LDPC decoding. Alternatively, or additionally, UE 110 may determine the estimated MCS value based on SINR measurements for a specific BLER (or BER).

Under a third proposed scheme in accordance with the present disclosure, UE 110 may report soft HARQ to network node 125 based on a delta SINR. Different options may be applied or otherwise configured to determine the delta SINR. In a first option (Option 1), the delta SINR may be defined as a difference between an estimated SINR value of a given PDSCH and a specific SINR reference value of the same PDSCH. For instance, to determine the delta SINR, UE 110 may first determine the estimated SINR of the PDSCH and then compare it to the SINR reference. The delta SINR may be defined or expressed as follows: delta SINR=SINR reference−SINR estimated.

In a second option (Option 2), the delta SINR may be defined as a difference of the estimated SINR value between two PDSCHs. For instance, UE 110 may determine the delta SINR between a DL transmission (e.g., PDSCH) and a previously received PDSCH. In a third option (Option 3), the delta SINR may be defined based on a difference in LLR quality values of a currently received PDSCH and a previously received PDSCH. For instance, UE 110 may determine the LLR values/variances for a given PDSCH to compare to the LLR values/variances of a previously received PDSCH, then the LLR quality value difference may be mapped to the delta SINR.

Under the proposed scheme, in Options 1, 2 and 3, UE 110 may determine the delta SINR for a given specific BLER (or BER). Alternatively, in Options 1, 2 and 3, UE 110 may determine the delta SINR without a given BLER (or BER). Alternatively, or additionally, UE 110 may determine an estimated SINR value based on LLR values and/or variances. Alternatively, or additionally, UE 110 may determine the estimated SINR value based on a change in a number of flipped bits before and after LDPC decoding. Alternatively, or additionally, UE 110 may determine the estimated SINR value based on SINR measurements for a specific BLER (or BER). Alternatively, or additionally, UE 110 may determine or otherwise calculate (or be configured with) the SINR reference under either a first approach or a second approach. In the first approach, the SINR reference may be configured by network node 125 (e.g., using radio resource control (RRC) parameters or downlink control information (DCI) or other options). For instance, network node 125 may indicate the SINR reference to UE 110 for UE 110 to use in calculating the delta SINR. In the second approach, the SINR reference may be calculated by UE 110 based on other configured parameters such as a specific BLER target or an indicated MCS value. For instance, UE 110 may determine the SINR reference value using the configured BLER target and the configured MCS value for a given PDSCH transmission.

Under a fourth proposed scheme in accordance with the present disclosure, UE 110 may report soft HARQ to network node 125 based on a delta BLER exponent. Different options may be applied or otherwise configured to determine the delta BLER exponent. In a first option (Option 1), the delta BLER may be defined as a difference between an estimated BLER exponent and a configured or specific target BLER exponent. For instance, to determine the delta BLER exponent, UE 110 may estimate the BLER of the PDSCH and compare it to the configured BLER target. In a second option (Option 2), the delta BLER exponent may be defined as a difference between the estimated BLER exponent of a DL transmission (e.g., PDSCH) and an estimated BLER exponent of a previous PDSCH. For instance, to determine the delta BLER exponent, UE 110 may estimate the BLER of the PDSCH and compare it to an estimated BLER of a different (e.g., previously received) PDSCH. In a third option (Option 3), the delta BLER exponent may be defined based on a difference in LLR quality values of the received PDSCH and the previously received PDSCH. For instance, UE 110 may first determine the LLR values and/or variances for the PDSCH and compare them to the LLR values and/or variances of a previously received PDSCH, and then UE 110 may map the difference in LLR quality values to the delta BLER.

Under the proposed scheme, in Options 1, 2 and 3, UE 110 may determine the delta BLER for a given specific BLER (or BER). Alternatively, in Options 1, 2 and 3, UE 110 may determine the delta BLER without a given BLER (or BER). Alternatively, or additionally, UE 110 may determine the estimated BLER value based on SINR measurements for a specific BLER (or BER) and a given MCS value. Alternatively, or additionally, UE 110 may determine the estimated BLER value based on a change in a number of flipped bits before and after LDPC decoding. Alternatively, or additionally, UE 110 may determine the estimated BLER value based on LLR values and/or LLR variance measurements. Alternatively, or additionally, UE 110 may determine the estimated BLER value based on a number of LDPC decoding iterations.

Under a fifth proposed scheme in accordance with the present disclosure, UE 110 may report soft HARQ to network node 125 based on a delta BER exponent (or exact BER exponent). Different options may be applied or otherwise configured to determine the delta BER exponent. In a first option (Option 1), the delta BER may be defined as a difference between an estimated BER exponent and a configured or specific target BER exponent. For instance, to determine the delta BER exponent, UE 110 may estimate the BER of the PDSCH and compare it to the configured BER target. In a second option (Option 2), the delta BER exponent may be defined as a difference between the estimated BER exponent of a DL transmission (e.g., PDSCH) and an estimated BER exponent of a previous PDSCH. For instance, to determine the delta BER exponent, UE 110 may estimate the BER of the PDSCH and compare it to an estimated BER of a different (e.g., previously received) PDSCH. In a third option (Option 3), the delta BER exponent may be defined based on a difference in LLR quality values of the received PDSCH and the previously received PDSCH. For instance, UE 110 may first determine the LLR values and/or variances for the PDSCH and compare them to the LLR values and/or variances of a previously received PDSCH, and then UE 110 may map the difference in LLR quality values to the delta BER. In a fourth option (Option 4), the exact BER exponent may be estimated and reported to network node 125.

Under the proposed scheme, in Options 2, 3 and 4, UE 110 may determine the delta (or exact) BER for a given specific BLER (or BER). Alternatively, in Options 2, 3 and 4, UE 110 may determine the delta (or exact) BER without a given BLER (or BER). Alternatively, or additionally, UE 110 may determine the estimated BER value based on SINR measurements for a specific BLER (or BER). Alternatively, or additionally, UE 110 may determine the estimated BER value based on LLR values and/or LLR variance measurements. Alternatively, or additionally, UE 110 may determine the estimated BER value based on a number of LDPC decoding iterations. Alternatively, or additionally, the measured BER may be defined as the flipped bits before and after LDPC decoding. Alternatively, or additionally, UE 110 may determine the estimated BER value based on the mean squared error (MSE) measured on the LLR values input to a decoder. Optionally, recovered encoded bits may be used as a reference to compute the error.

Under each of the above-described first, second, third, fourth and fifth proposed schemes, the given specific BLER (or BER) (or BLER/BER target) may be configured by a higher-layer parameter (e.g., RRC parameter(s)). For instance, the given specific BLER (or BER) (or BLER/BER target) may be configured per TB. Alternatively, or additionally, the given specific BLER (or BER) (or BLER/BER target) may be configured per CBG. Alternatively, or additionally, the given specific BLER (or BER) (or BLER/BER target) may be configured per codebook. Under each of the above-described proposed schemes, the previously received PDSCH, which may be considered as a reference, may be indicated by one or more different options. For instance, network node 125 may use RRC parameter(s) to indicate or otherwise select which one of multiple previously received PDSCHs is to be used as a reference. Alternatively, UE 110 may select the PDSCH to be used as a reference. For instance, UE 110 may select the latest received PDSCH or UE 110 may select another previously received PDSCH that was received with the same configured MCS as that of the PDSCH in concern.

Under a sixth proposed scheme in accordance with the present disclosure, UE 110 may report soft HARQ to network node 125 based on an estimated x-step of exact (or delta) BLER exponent, exact (or delta) BER exponent, exact (or delta) SINR level, exact (or delta) MCS index, or exact (or delta) LLR level or variance. For example, for x=2 with BLER exponent, BLER exponent estimation granularity may be equal to two, which means estimated BLERs of 0.1 and 0.01 may be reported in a single entry in the soft HARQ. As another example, for x=1 with SINR level, SINR estimation granularity may be equal to one, which means each SINR integer value may be reported as a single entry in the soft HARQ.

Under the proposed scheme, the x value may be configured or otherwise applied by a high-layer signaling (e.g., RRC parameter(s)). Alternatively, or additionally, the x value may be configured or otherwise applied according to a BLER target. Alternatively, or additionally, the x value may be configured or otherwise applied according to a configured bandwidth part (BWP) size. Alternatively, or additionally, the x value may be configured or otherwise applied according to a numerology (e.g., bandwidth subcarrier spacing). Alternatively, or additionally, the x value may be configured or otherwise applied according to HARQ feedback such as ACK and/or NACK. Alternatively, or additionally, the x value may be configured or otherwise applied according to an initial transmission and a retransmission. Alternatively, or additionally, the x value may be configured or otherwise applied according to a RV index. Alternatively, or additionally, the x value may be configured or otherwise applied according to UE calculations by UE 110. Alternatively, or additionally, different options based on a number of bits may be considered.

Under a seventh proposed scheme in accordance with the present disclosure, additional soft information (e.g., delta BLER exponent) may be mapped into reporting tables and reported with (e.g., in addition to) an existing HARQ scheme as soft HARQ (with additional information). Under the proposed scheme, UE 110 may map estimated soft information, such as delta BLER exponents, to reporting tables (based on different options) using additional bits. Then, in addition to the existing HARQ feedback scheme, UE 110 may report the mapped information as soft HARQ feedback. FIG. 3 illustrates an example design 300 under the proposed scheme. Specifically, the table shown in FIG. 3 depicts the mapping of delta BLER exponents to a 2-bit table soft HARQ.

Under the proposed scheme, entries of the mapped reporting tables, which may be used to report the additional information, may be defined, configured or otherwise applied with different options. In a first option (Option 1), the selected reporting tables may be defined in the 3GPP specifications. For instance, network node 125 may, using high-layer parameter(s) such as RRC parameter(s), select which table from the 3GPP specifications to use for reporting. Alternatively, UE 110 may select the table from the 3GPP specifications to use for reporting. In a second option (Option 2), entries of the reporting tables may be configured or otherwise modified by network node 125.

Under the proposed scheme, different options based on the number of bits may be considered. In a first option (Option 1), two bits may be used for soft HARQ and hence four entries may be reported. For instance, the entries for delta BLER exponents may be ≤0, =1, =2 and ≥3, as shown in FIG. 3. In a second option (Option 2), one bit may be used for soft HARQ and hence two entries may be reported. In a third option (Option 3), three bits may be used for soft HARQ and hence eight entries may be defined.

Under the proposed scheme, different reporting tables may be applied or used for different additional information. For instance, the tables used for reporting delta BLER may be different from the tables used for reporting delta MCS. It is noteworthy that, the additional information reporting tables may be used or otherwise applied for one or more, or different combinations, of the first, second, third, fourth and fifth proposed schemes described above.

Under an eighth proposed scheme in accordance with the present disclosure, additional soft information may be merged with an existing HARQ reporting feedback to result in a soft HARQ feedback scheme. That is, the additional soft information with ACK and NACK may be mapped into reporting tables to represent soft ACK and soft NACK levels, hence the new scheme may be a soft HARQ feedback scheme. FIG. 4 illustrates an example design 400 under the proposed scheme. Specifically, the table shown in FIG. 4 depicts a mapping method using a 2-bit table with delta BLER exponents and ACK/NACK information.

Under the proposed scheme, the soft HARQ defined in the first, second, third, fourth and fifth proposed schemes described above may be mapped to soft ACK and soft NACK. Alternatively, or additionally, the mapped soft ACK and soft NACK may be based on one or more of the above-described proposed schemes. For instance, the soft ACK levels may be based on the estimated delta BLER, estimated delta SINR, or estimated delta MCS.

Under the proposed scheme, different reporting options may be considered based on the number of bits or other parameters. In a first option (Option 1), two bits may be used for soft HARQ to define three soft ACK levels plus one hard NACK level. For instance, the three ACK levels may be based on delta BLER exponent, which may be ≤0 for high soft ACK, =1 for medium soft ACK, ≥2 for low soft ACK, with the fourth entry for NACK. Alternatively, the two bits may be used for soft HARQ to define two soft ACK levels plus two soft NACK levels. For instance, there may be one entry for high ACK, one entry for low ACK, one entry for high NACK and one entry for low ACK, as shown in FIG. 4. Still alternatively, the two soft ACK levels plus two soft NACK levels may be applied for an initial transmission, while the three soft ACK levels plus one hard NACK level may be applied for retransmission(s). In a second option (Option 2), three bits may be used for soft HARQ, hence eight entries may be defined.

Under a ninth proposed scheme in accordance with the present disclosure, UE 110 may report to network node 125 the soft ACK and the reason of decoding failure in addition to an existing HARQ scheme. That is, in addition to the existing HARQ scheme, UE 110 may report additional information (which may include soft ACK levels and the reason of decoding failure in case of NACK(s)) using additional bits, with the information in these additional bits being the reporting tables. FIG. 5 illustrates an example design 500 under the proposed scheme. For instance, the table on the left side of FIG. 5 depicts mapping information (e.g., the reason of decoding failure) with NACK using two bits. Moreover, the table on the right side of FIG. 5 depicts mapping information (e.g., delta BLER exponents) with ACK using two bits. The ACK and NACK information may be reported using the existing HARQ feedback.

Under the proposed scheme, entries of the reporting tables, which are used to report the additional information, may be defined, configured or otherwise applied with different options. In a first option (Option 1), the selected reporting table may be defined in the 3GPP specifications. For instance, network node 125 may, using high-layer parameter(s) such as RRC parameter(s), select which table from the 3GPP specifications to use for reporting. Alternatively, UE 110 may select the table from the 3GPP specifications to use for reporting. In a second option (Option 2), entries of the reporting tables may be configured or modified by network node 125.

Under the proposed scheme, different options based on the number of bits may be considered. In a first option (Option 1), one bit may be used for soft ACK and the reason of decoding failure and hence two entries may be reported for either soft ACK or decoding failure. In some cases, two entries may be used for soft HARQ or two entries may be used for the reason of decoding failure. For instance, one entry may be used for soft high ACK, one entry may be used for soft low ACK, one entry may be used for NACK with inter-cell interference as the reason of decoding failure, and one entry may be used for NACK with fading as the reason of decoding failure, as shown in FIG. 5. In a second option (Option 2), two bits may be used for soft HARQ and hence four entries may be reported for either soft ACK or decoding failure. In a third option (Option 3), three bits may be used for soft HARQ and hence eight entries may be defined for either soft ACK or decoding failure.

Under the proposed scheme, the soft ACK levels may be based on different soft HARQ additional information. For instance, the tables used for reporting delta BLER may be different from the tables used for reporting delta MCS. It is noteworthy that, the additional information reporting tables may be used or otherwise applied for one or more, or different combinations, of the first, second, third, fourth and fifth proposed schemes described above.

Under a tenth proposed scheme in accordance with the present disclosure, soft ACK and information of the reason of decoding failure may be merged with an existing HARQ reporting feedback. That is, the additional soft information with ACK and NACK may be mapped into reporting tables to represent soft ACK levels and NACK with decoding failure reasons, hence the new scheme may be a soft HARQ feedback scheme. FIG. 6 illustrates an example design 600 under the proposed scheme. Specifically, the table shown in FIG. 6 depicts mapping of delta BLER exponents for ACK cases and the reason for decoding failure for NACK cases to a 2-bit table soft HARQ.

Under the proposed scheme, entries of the reporting tables, used to report the additional information, may be defined, configured or otherwise applied with different options. In a first option (Option 1), the selected reporting tables may be defined in the 3GPP specifications. For instance, network node 125 may, using high-layer parameter(s) such as RRC parameter(s), select which table from the 3GPP specifications to use for reporting. Alternatively, UE 110 may select the table from the 3GPP specifications to use for reporting. In a second option (Option 2), entries of the reporting tables may be configured or modified by network node 125.

Under the proposed scheme, different options based on the number of bits may be considered. In a first option (Option 1), two bits may be used for soft ACK and the reason of decoding failure, different options may be defined. Specifically, two soft ACK levels plus two NACK levels with reason of decoding failure may be defined. Referring to the table shown in FIG. 6, the two soft ACK levels may be based on delta BLER exponent, while the NACK level may be based on either inter-cell interference or facing or beam blockage. In a second option (Option 2), three bits may be used for soft ACK and the reason of decoding failure, hence eight entries may be defined.

Under the proposed scheme, the soft ACK levels may be based on different soft HARQ additional information. For instance, the tables used for reporting delta BLER may be different from the tables used for reporting delta MCS. It is noteworthy that, the additional information reporting tables may be used or otherwise applied for one or more, or different combinations, of the first, second, third, fourth and fifth proposed schemes described above.

With respect to the above-described sixth, seventh, eight, ninth and tenth proposed schemes, the selection of one or more reporting tables under the sixth, seventh, eight, ninth and tenth proposed schemes may be configured or otherwise applied by RRC parameters. Alternatively, or additionally, the selection of one or more reporting tables under the sixth, seventh, eight, ninth and tenth proposed schemes may be configured or otherwise applied according to a BLER target. Alternatively, or additionally, the selection of one or more reporting tables under the sixth, seventh, eight, ninth and tenth proposed schemes may be configured or otherwise applied according to a configured BWP size. Alternatively, or additionally, the selection of one or more reporting tables under the sixth, seventh, eight, ninth and tenth proposed schemes may be configured or otherwise applied according to a numerology (e.g., bandwidth subcarrier spacing). Alternatively, or additionally, the selection of one or more reporting tables under the sixth, seventh, eight, ninth and tenth proposed schemes may be configured or otherwise applied according to a HARQ feedback such as ACK and/or NACK.

Alternatively, or additionally, the selection of one or more reporting tables under the sixth, seventh, eight, ninth and tenth proposed schemes may be configured or otherwise applied according to an initial transmission and its corresponding retransmission(s). Alternatively, or additionally, the selection of one or more reporting tables under the sixth, seventh, eight, ninth and tenth proposed schemes may be configured or otherwise applied according to a RV index.

Under an eleventh proposed scheme in accordance with the present disclosure, a soft HARQ feedback may be applied, reported or otherwise configured differently for the initial transmission and its corresponding retransmission(s). Under the proposed scheme, UE 110 may report soft HARQ using the same reporting mechanism for initial transmission and retransmission(s), such as reporting soft ACK information. However, the parameters and/or the metrics of defining the soft ACK for the initial transmission and retransmission(s) may be different. For example, UE 110 may be configured to use different BLER targets in the process of finding the soft ACK for the initial transmission and retransmission(s). As another example, different numbers of LDPC decoding iterations may be considered to define high ACK for the initial transmission and retransmission(s). More specifically, UE 110 may report the ACK as a high ACK when the number of LDPC decoding iterations is 8 for the case of initial transmission, while the same high ACK may be reported for the number of LDPC decoding iterations 3 for the case of retransmission.

Under the proposed scheme, UE 110 may report to network node 125 with different mechanisms or options of finding or estimating and reporting the soft HARQ for the initial transmission and retransmission(s). For example, UE 110 may report with soft HARQ for initial transmissions and reporting with an existing HARQ for retransmissions. As another example, the soft HARQ for the initial transmission may be based on the estimated BLER, while the soft HARQ of the retransmission(s) may be based on delta MCS. Alternatively, or additionally, UE 110 may report with different mechanisms or options based on the RV index.

It is noteworthy that there may be different options for the reporting granularity of soft HARQ (e.g., soft ACK/NACK) when UE 110 reports soft HARQ-ACK to network node 125, such as reporting per CB, per CBG or per TB. Under a twelfth proposed scheme in accordance with the present disclosure, UE 110 may determine and report to network node 125 a single soft HARQ feedback report per CB. For instance, UE 110 may determine and report the soft HARQ per CB using LLR values/variances or SINR values, number of LDPC iterations, estimated BLER, MCS/channel quality indicator (CQI) value or difference value, or BER per CB.

Under a thirteenth proposed scheme in accordance with the present disclosure, UE 110 may determine and report to network node 125 a single soft HARQ feedback report per CBG. In a first option (Option 1), using LLR values/variances or SINR values, estimated BLER, MCS/CQI value or difference MCS/CQI value, or BER, UE 110 may determine the soft HARQ per CB in a CBG. For instance, UE 110 may determine and report the average CBs' soft HARQ per CBG (option 1a). Alternatively, UE 110 may determine and report the best or highest soft HARQ of a CB per CBG (option 1b). Alternatively, UE 110 may determine and report the worst or lowest soft HARQ of a CB per CBG (option 1c). In a second option (Option 2), using a number of LDPC iterations per CB, UE 110 may determine the soft HARQ per CB in a CBG. For instance, UE 110 may determine and report the common CBs' soft HARQ per CBG (option 2a). Alternatively, UE 110 may determine and report the best or highest soft HARQ of a CB per CBG (option 2b). Alternatively, UE 110 may determine and report the worst or lowest soft HARQ of a CB per CBG (option 2c). In a third option (Option 3), UE 110 may report to network node 125 with different combinations of options for the cases of initial transmission and retransmission. For instance, UE 110 may report with options 1a and 2a for initial transmissions and options 1c and 2c for retransmissions. Alternatively, UE 110 may report with different combinations of options for the cases of NACK and ACK. For instance, UE 110 may report with options 1a, 1c, 2a and 2c for ACK and options 1b and 2b for NACK per CBG. In a fourth option (Option 4), UE 110 may report two quantities of the given options in the thirteenth proposed scheme (e.g., the lowest soft HARQ and highest soft HARQ, or the average soft HARQ and lowest soft HARQ, or the average soft HARQ and highest soft HARQ). In a fifth option (Option 5), UE 110 may determine a soft HARQ based on CB with ACK and another soft HARQ based on CB with NACK (option 5a). For instance, the CBs with ACK may be excluded (option 5b). Alternatively, the CBs with NACK may be excluded. Alternatively, either or both of options 5a and 5b may be applied, configured or otherwise selected based on the reporting configurations.

Under a fourteenth proposed scheme in accordance with the present disclosure, UE 110 may determine and report to network node 125 a single soft HARQ feedback report per TB. In a first option (Option 1), using LLR variances and/or values or SINR values, number of LDPC iterations, estimated BLER, MCS/CQI value or difference value, or BER, UE 110 may determine the soft HARQ per CB. For instance, UE 110 may determine and report the average soft HARQ per TB (option 1a). Alternatively, for the case of using the number of LDPC iterations, UE 110 may determine and report the common soft HARQ per TB (option 1b). Alternatively, UE 110 may determine and report the best or highest soft HARQ of a CB per TB (option 1c). Alternatively, UE 110 may determine and report the worst or lowest soft HARQ of a CB per TB (option 1d). Alternatively, UE 110 may report with one of the above options for NACK and a different option for ACK (option 1e). For instance, UE 110 may report with option 1a, 1b or 1c for ACK and report with option 1d for NACK. Alternatively, UE 110 may report with one of the above options for initial transmission and a different option for retransmission (option 1f). For instance, UE 110 may report with option 1a, 1b or 1c for initial transmission and report with option 1d for retransmission.

In a second option (Option 2), using LLR variances and/or values or SINR values, number of LDPC iterations, estimated BLER, or BER, UE 110 may determine the soft HARQ per CBG as in options 1a, 1b, 1c, 1d, 1e and 1f described above. For instance, UE 110 may determine and report the highest or best soft HARQ report per TB out of the best soft HARQ CBG values (option 2a). Alternatively, UE 110 may determine and report the highest or best soft HARQ report per TB out of the worst soft HARQ CBG values (option 2b). Alternatively, UE 110 may determine and report the highest or best soft HARQ report per TB out of the average/common soft HARQ CBG values (option 2c). Alternatively, UE 110 may determine and report the worst or lowest soft HARQ report per TB out of the best soft HARQ CBG values (option 2d). Alternatively, UE 110 may determine and report the worst or lowest soft HARQ report per TB out of the worst soft HARQ CBG values (option 2e). Alternatively, UE 110 may determine and report the worst or lowest soft HARQ report per TB out of the average/common soft HARQ CBG values (option 2f). Alternatively, UE 110 may determine and report the average/common soft HARQ report per TB out of the best soft HARQ CBG values (option 2g). Alternatively, UE 110 may determine and report the average/common soft HARQ report per TB out of the worst soft HARQ CBG values (option 2h). Alternatively, UE 110 may determine and report the average/common soft HARQ report per TB out of the average/common soft HARQ CBG values (option 2i).

In a third option (Option 3), UE 110 may report with different combinations of options for the cases of NACK and ACK. For instance, UE 110 may report with option 2a or 2c for ACK and report with option 2b for NACK per TB. In a fourth option (Option 4), UE 110 may report with different combinations of options for the cases of initial transmission and retransmission. For instance, UE 110 may report with option 2a or 2c for initial transmission and report with option 2b for retransmission. In a fifth option (Option 5), UE 110 may report two quantities of given options under this proposed scheme (e.g., the lowest soft HARQ and the highest soft HARQ, the average soft HARQ and lowest soft HARQ, or the average soft HARQ and the highest soft HARQ). In a sixth option (Option 6), UE 110 may determine a soft HARQ based on CBG with ACK and another soft HARQ based on CBG with NACK. For instance, the CBG with ACK may be excluded (option 6a). Alternatively, the CBG with NACK may be excluded (option 6b). Alternatively, either or both of options 6a and 6b may be applied, configured or otherwise selected based on the reporting configurations.

It is noteworthy that, in all of the above-described proposed schemes, the BLER (or BER) target may be configured by higher-layer parameter(s) (e.g., RRC parameter(s)). For instance, the BLER (or BER) target may be configured or otherwise defined per TB. Alternatively, or additionally, the BLER (or BER) target may be configured or otherwise defined per CBG. Alternatively, or additionally, the BLER (or BER) target may be configured or otherwise defined per codebook.

Illustrative Implementations

Figure 7:
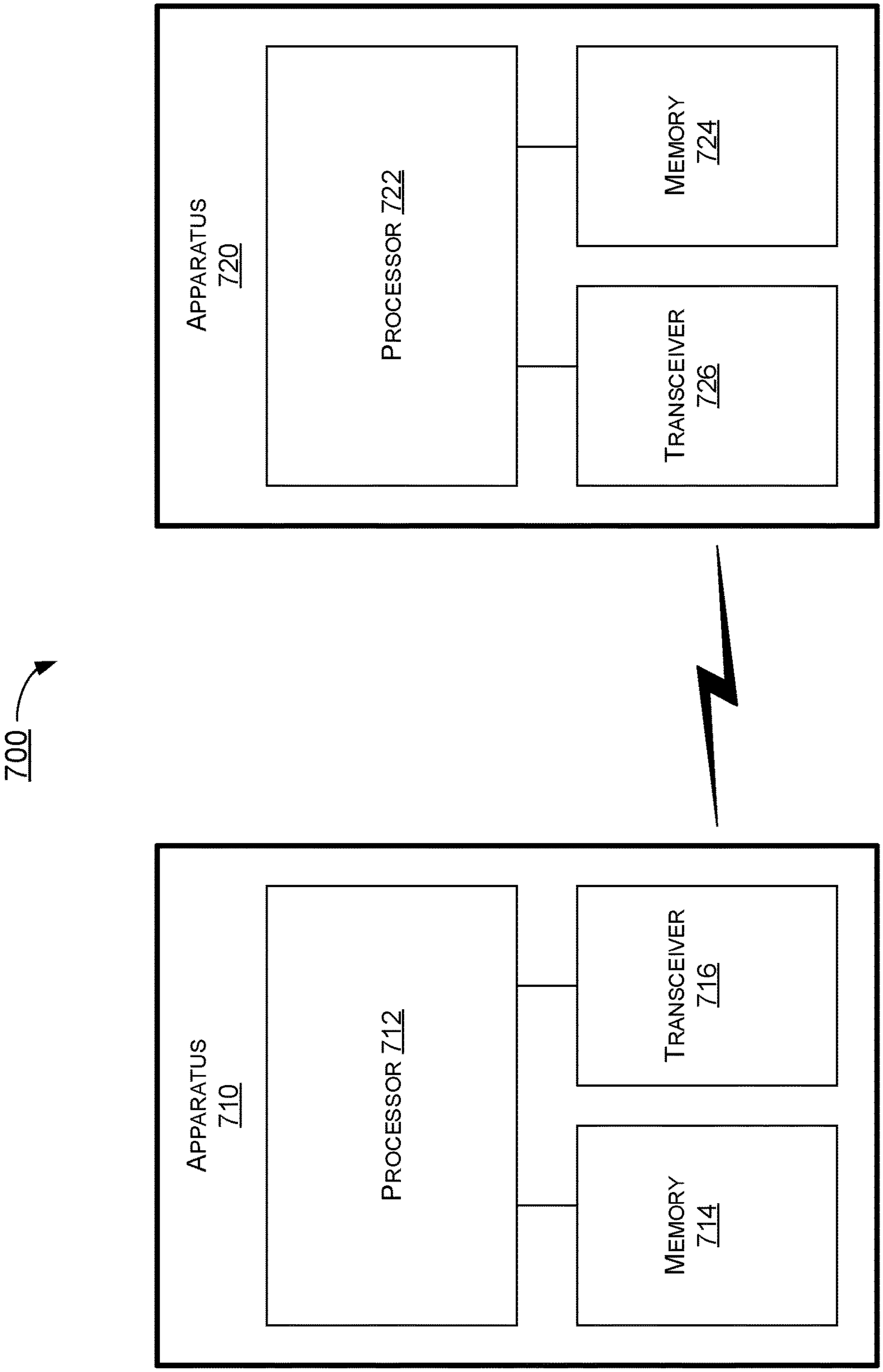
FIG. 7 is a block diagram of an example communication system in accordance with an implementation of the present disclosure.

FIG. 7 illustrates an example communication system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to soft HARQ schemes, signaling methods and reporting granularity in mobile communications, including the various schemes described above with respect to various proposed designs, concepts, schemes, systems and methods described above, including network environment 100, as well as processes described below.

Each of apparatus 710 and apparatus 720 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 710 and apparatus 720 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in an eNodeB in an LTE, LTE-Advanced or LTE-Advanced Pro network or in a gNB or TRP in a 5G network, an NR network or an IoT network.

In some implementations, each of apparatus 710 and apparatus 720 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 710 and apparatus 720 may be implemented in or as a network apparatus or a UE. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more CISC or RISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to soft HARQ schemes, signaling methods and reporting granularity in mobile communications in accordance with various implementations of the present disclosure.

In some implementations, apparatus 710 may also include a transceiver 716 coupled to processor 712. Transceiver 716 may be capable of wirelessly transmitting and receiving data. In some implementations, transceiver 716 may be capable of wirelessly communicating with different types of wireless networks of different radio access technologies (RATs). In some implementations, transceiver 716 may be equipped with a plurality of antenna ports (not shown) such as, for example, four antenna ports. That is, transceiver 716 may be equipped with multiple transmit antennas and multiple receive antennas for multiple-input multiple-output (MIMO) wireless communications. In some implementations, apparatus 720 may also include a transceiver 726 coupled to processor 722. Transceiver 726 may include a transceiver capable of wirelessly transmitting and receiving data. In some implementations, transceiver 726 may be capable of wirelessly communicating with different types of UEs/wireless networks of different RATs. In some implementations, transceiver 726 may be equipped with a plurality of antenna ports (not shown) such as, for example, four antenna ports. That is, transceiver 726 may be equipped with multiple transmit antennas and multiple receive antennas for MIMO wireless communications.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as a UE (e.g., UE 110), and apparatus 720, as a network node (e.g., network node 125) of a wireless network (e.g., network 120 as a 5G/NR mobile network), is provided below.

Under various proposed schemes in accordance with the present disclosure pertaining to soft HARQ schemes, signaling methods and reporting granularity in mobile communications, processor 712 of apparatus 710, implemented in or as UE 110, may receive, via transceiver 716, a transmission (e.g., PDSCH transmission) from a network node of a wireless network (e.g., apparatus 720 as network node 125 of wireless network 120). Additionally, processor 712 may generate a soft HARQ. Moreover, processor 712 may transmit, via transceiver 716, transmitting the soft HARQ to the network node.

In generating the soft HARQ, processor 712 may perform certain operations. For instance, processor 712 may select a measurement method, a metric and a reporting granularity. Additionally, processor 712 may generate the soft HARQ using the selected measurement method, the selected metric and the selected reporting granularity.

In some implementations, in transmitting the soft HARQ to the network node, processor 712 may report the soft HARQ based on a degree of difficulty in decoding the PDSCH transmission.

In some implementations, in transmitting the soft HARQ to the network node, processor 712 may report the soft HARQ based on a delta MCS which is a difference between an MCS used for the PDSCH transmission and an estimated MCS.

In some implementations, in transmitting the soft HARQ to the network node, processor 712 may report the soft HARQ based on a delta SINR which is a difference between a reference SINR and an estimated SINR.

In some implementations, in transmitting the soft HARQ to the network node, processor 712 may report the soft HARQ based on a delta BLER exponent which is a difference between an estimated BLER exponent and a configured or specific target BLER exponent.

In some implementations, in transmitting the soft HARQ to the network node, processor 712 may report the soft HARQ based on a delta BER exponent which is a difference between an estimated BER exponent and a configured or specific target BER exponent.

In some implementations, in transmitting the soft HARQ to the network node, processor 712 may report the soft HARQ based on an estimated x-step of an exact or delta BLER exponent, an exact or delta BER exponent, an exact or delta SINR, or an exact or delta MCS index. Here, the delta BLER exponent is a difference between an estimated BLER exponent and a configured or specific target BLER exponent; the delta BER exponent is a difference between an estimated BER exponent and a configured or specific target BER exponent; the delta SINR is a difference between a reference SINR and an estimated SINR; and the delta MCS index is a difference between an estimated MCS value of a PDSCH based on a reference, specific or configured BLER or BER and an MCS used for the PDSCH transmission.

In some implementations, the soft HARQ may include additional soft information of a plurality of delta BLER exponents each of which being a difference between a respective estimated BLER exponent and a configured or specific target BLER exponent. Moreover, the plurality of delta BLER exponents may be mapped to a reporting table included in the soft HARQ.

In some implementations, the soft HARQ may include additional soft information merged with an existing HARQ reporting feedback.

In some implementations, in transmitting the soft HARQ to the network node, processor 712 may report a soft ACK and a reason of decoding failure in addition to an existing HARQ scheme.

In some implementations, in transmitting the soft HARQ to the network node, processor 712 may report a soft ACK and a reason of decoding failure which are merged with an existing HARQ reporting feedback.

In some implementations, the soft HARQ may be applied, reported or configured differently depending on whether the received transmission is an initial transmission or a retransmission.

In some implementations, in transmitting the soft HARQ to the network node, processor 712 may report a single soft HARQ feedback report per CB. Alternatively, in transmitting the soft HARQ to the network node, processor 712 may report a single soft HARQ feedback report per CBG. in transmitting the soft HARQ to the network node, processor 712 may report a single soft HARQ feedback report per TB.

In some implementations, in selecting the measurement method, processor 712 may select the measurement method based on: (a) a BER according to flipped LLR values or variances or SINR measurements, or (b) a degree of difficulty in decoding the received transmission.

In some implementations, in selecting the metric, processor 712 may select the metric based on: (a) a delta SINR which is a difference between a reference SINR and an estimated SINR, (b) a delta BLER exponent which is a difference between an estimated BLER exponent and a configured or specific target BLER exponent, (c) a delta BER exponent which is a difference between an estimated BER exponent and a configured or specific target BER exponent, or (d) a delta MCS index which is a difference between an estimated MCS value of the received transmission based on a reference, specific or configured BLER or BER and an MCS used for the received transmission.

In some implementations, in selecting the reporting granularity, processor 712 may select the reporting granularity per CB, per CBG or per TB.

Illustrative Processes

Figure 8:
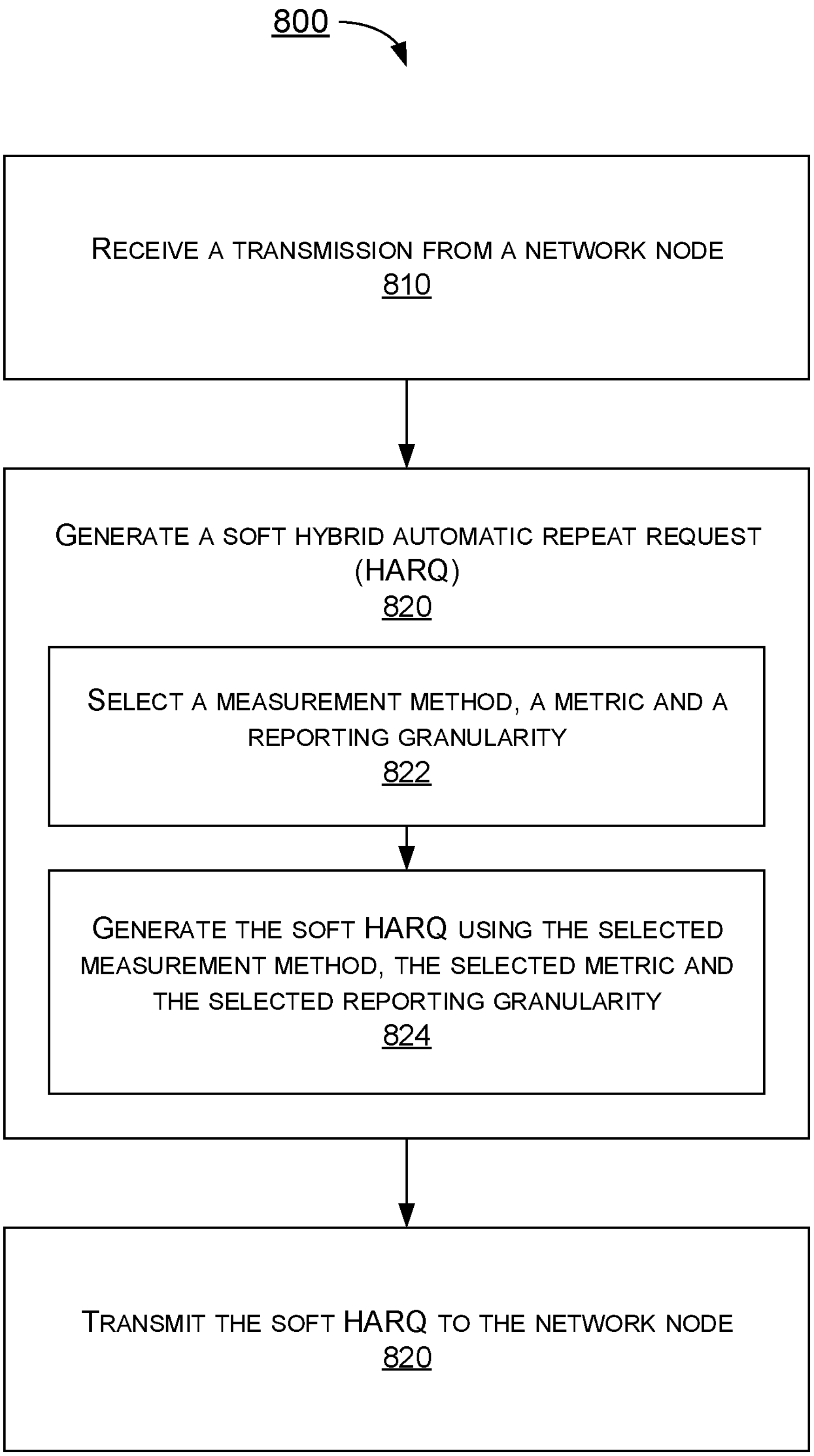
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above, whether partially or entirely, including those pertaining to those described above. More specifically, process 800 may represent an aspect of the proposed concepts and schemes pertaining to soft HARQ schemes, signaling methods and reporting granularity in mobile communications. Process 800 may include one or more operations, actions, or functions as illustrated by one or more of blocks 810, 820 and 830 as well as sub-blocks 822 and 824. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed iteratively. Process 800 may be implemented by or in apparatus 710 and apparatus 720 as well as any variations thereof. Solely for illustrative purposes and without limiting the scope, process 800 is described below in the context of apparatus 710 as a UE (e.g., UE 110) and apparatus 720 as a communication entity such as a network node or base station (e.g., network node 125) of a wireless network (e.g., wireless network 120). Process 800 may begin at block 810.

At 810, process 800 may involve processor 712 of apparatus 710 receiving, via transceiver 716, a transmission (e.g., PDSCH transmission) from a network node of a wireless network (e.g., apparatus 720 as network node 125 of wireless network 120). Process 800 may proceed from 810 to 820.

At 820, process 800 may involve processor 712 generating a soft HARQ. Process 800 may proceed from 820 to 830.

At 830, process 800 may involve processor 712 transmitting, via transceiver 716, transmitting the soft HARQ to the network node.

In generating the soft HARQ, process 800 may involve processor 712 performing certain operations as represented by sub-blocks 822 and 824.

At 822, process 800 may involve processor 712 selecting a measurement method, a metric and a reporting granularity. Process 800 may proceed from 822 to 824.

At 824, process 800 may involve processor 712 generating the soft HARQ using the selected measurement method, the selected metric and the selected reporting granularity.

In some implementations, in transmitting the soft HARQ to the network node, process 800 may involve processor 712 reporting the soft HARQ based on a degree of difficulty in decoding the PDSCH transmission.

In some implementations, in transmitting the soft HARQ to the network node, process 800 may involve processor 712 reporting the soft HARQ based on a delta MCS which is a difference between an MCS used for the PDSCH transmission and an estimated MCS.

In some implementations, in transmitting the soft HARQ to the network node, process 800 may involve processor 712 reporting the soft HARQ based on a delta SINR which is a difference between a reference SINR and an estimated SINR.

In some implementations, in transmitting the soft HARQ to the network node, process 800 may involve processor 712 reporting the soft HARQ based on a delta BLER exponent which is a difference between an estimated BLER exponent and a configured or specific target BLER exponent.

In some implementations, in transmitting the soft HARQ to the network node, process 800 may involve processor 712 reporting the soft HARQ based on a delta BER exponent which is a difference between an estimated BER exponent and a configured or specific target BER exponent.

In some implementations, in transmitting the soft HARQ to the network node, process 800 may involve processor 712 reporting the soft HARQ based on an estimated x-step of an exact or delta BLER exponent, an exact or delta BER exponent, an exact or delta SINR, or an exact or delta MCS index. Here, the delta BLER exponent is a difference between an estimated BLER exponent and a configured or specific target BLER exponent; the delta BER exponent is a difference between an estimated BER exponent and a configured or specific target BER exponent; the delta SINR is a difference between a reference SINR and an estimated SINR; and the delta MCS index is a difference between an estimated MCS value of a PDSCH based on a reference, specific or configured BLER or BER and an MCS used for the PDSCH transmission.

In some implementations, the soft HARQ may include additional soft information of a plurality of delta BLER exponents each of which being a difference between a respective estimated BLER exponent and a configured or specific target BLER exponent. Moreover, the plurality of delta BLER exponents may be mapped to a reporting table included in the soft HARQ.

In some implementations, the soft HARQ may include additional soft information merged with an existing HARQ reporting feedback.

In some implementations, in transmitting the soft HARQ to the network node, process 800 may involve processor 712 reporting a soft ACK and a reason of decoding failure in addition to an existing HARQ scheme.

In some implementations, in transmitting the soft HARQ to the network node, process 800 may involve processor 712 reporting a soft ACK and a reason of decoding failure which are merged with an existing HARQ reporting feedback.

In some implementations, the soft HARQ may be applied, reported or configured differently depending on whether the received transmission is an initial transmission or a retransmission.

In some implementations, in transmitting the soft HARQ to the network node, process 800 may involve processor 712 reporting a single soft HARQ feedback report per CB. Alternatively, in transmitting the soft HARQ to the network node, process 800 may involve processor 712 reporting a single soft HARQ feedback report per CBG. in transmitting the soft HARQ to the network node, process 800 may involve processor 712 reporting a single soft HARQ feedback report per TB.

In some implementations, in selecting the measurement method, process 800 may involve processor 712 selecting the measurement method based on: (a) a BER according to flipped LLR values or variances or SINR measurements, or (b) a degree of difficulty in decoding the received transmission.

In some implementations, in selecting the metric, process 800 may involve processor 712 selecting the metric based on: (a) a delta SINR which is a difference between a reference SINR and an estimated SINR, (b) a delta BLER exponent which is a difference between an estimated BLER exponent and a configured or specific target BLER exponent, (c) a delta BER exponent which is a difference between an estimated BER exponent and a configured or specific target BER exponent, or (d) a delta MCS index which is a difference between an estimated MCS value of the received transmission based on a reference, specific or configured BLER or BER and an MCS used for the received transmission.

In some implementations, in selecting the reporting granularity, process 800 may involve processor 712 selecting the reporting granularity per CB, per CBG or per TB.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving a transmission from a network node;

generating a soft hybrid automatic repeat request (HARQ); and transmitting the soft HARQ to the network node, wherein the generating of the soft HARQ comprises:

selecting a measurement method, a metric and a reporting granularity; and generating the soft HARQ using the selected measurement method, the selected metric and the selected reporting granularity, wherein the selecting of the metric comprises selecting the metric based on:

a delta signal-to-interference-and-noise ratio (SINR) which is a difference between a reference SINR and an estimated SINR; or a delta block error rate (BLER) exponent which is a different between an estimated BLER exponent and a configured or specific target BLER exponent; or a delta bit error rate (BER) exponent which is a difference between an estimated BER exponent and a configured or specific target BER exponent; or a delta modulation coding scheme (MCS) index which is a difference between an estimated MCS value of the received transmission based on a reference, specific or configured BLER or BER and an MCS used for the received transmission, wherein the selecting of the reporting granularity comprises selecting the reporting granularity per code block (CB), per code block group (CBG) or per transport block (TB), and wherein the selecting of the measurement method comprises selecting the measurement method based on:

a BER according to flipped log-likelihood ratio (LLR) values or variances or SINR measurements; or a degree of difficulty in decoding the received transmission.

2. The method of claim 1, wherein the transmission comprises a physical downlink shared channel (PDSCH) transmission, and wherein the transmitting of the soft HARQ to the network node comprises reporting the soft HARQ based on a degree of difficulty in decoding the PDSCH transmission.

3. The method of claim 1, wherein the transmission comprises a physical downlink shared channel (PDSCH) transmission, and wherein the transmitting of the soft HARQ to the network node comprises reporting the soft HARQ based on the delta MCS index.

4. The method of claim 1, wherein the transmitting of the soft HARQ to the network node comprises reporting the soft HARQ based on the delta SINR.

5. The method of claim 1, wherein the transmitting of the soft HARQ to the network node comprises reporting the soft HARQ based on the delta BLER exponent.

6. The method of claim 1, wherein the transmitting of the soft HARQ to the network node comprises reporting the soft HARQ based on the delta BER exponent.

7. The method of claim 1, wherein the transmission comprises a physical downlink shared channel (PDSCH) transmission, wherein the transmitting of the soft HARQ to the network node comprises reporting the soft HARQ based on an estimated x-step of an exact BLER or the delta BLER exponent, an exact BER or the delta BER exponent, an exact SINR or the delta SINR, or an exact MCS index or the delta MCS index.

8. The method of claim 1, wherein the soft HARQ comprises additional soft information of a plurality of delta block error rate (BLER) exponents each of which being a difference between a respective estimated BLER exponent and a configured or specific target BLER exponent, and wherein the plurality of delta BLER exponents are mapped to a reporting table included in the soft HARQ.

9. The method of claim 1, wherein the soft HARQ comprises additional soft information merged with an existing HARQ reporting feedback.

10. The method of claim 1, wherein the transmitting of the soft HARQ to the network node comprises reporting a soft acknowledgement (ACK) and a reason of decoding failure in addition to an existing HARQ scheme.

11. The method of claim 1, wherein the transmitting of the soft HARQ to the network node comprises reporting a soft acknowledgement (ACK) and a reason of decoding failure which are merged with an existing HARQ reporting feedback.

12. The method of claim 1, wherein the soft HARQ is applied, reported or configured differently depending on whether the received transmission is an initial transmission or a retransmission.

13. The method of claim 1, wherein the transmitting of the soft HARQ to the network node comprises reporting a single soft HARQ feedback report per CB.

14. The method of claim 1, wherein the transmitting of the soft HARQ to the network node comprises reporting a single soft HARQ feedback report per CBG.

15. The method of claim 1, wherein the transmitting of the soft HARQ to the network node comprises reporting a single soft HARQ feedback report per TB.

16. An apparatus, comprising:

a transceiver configured to communicate wirelessly; and a processor coupled to the transceiver and configured to perform operations comprising:

receiving, via the transceiver, a transmission from a network node;

generating a soft hybrid automatic repeat request (HARQ); and transmitting, via the transceiver, the soft HARQ to the network node, wherein, in generating the soft HARQ, the processor is configured to perform operations comprising:

selecting a measurement method, a metric and a reporting granularity; and generating the soft HARQ using the selected measurement method, the selected metric and the selected reporting granularity, wherein, in selecting the metric, the processor is configured to select the metric based on:

delta signal-to-interference-and-noise ratio (SINR) which is a difference between a reference SINR and an estimated SINR; or delta block error rate (BLER) exponent which is a different between an estimated BLER exponent and a configured or specific target BLER exponent; or delta bit error rate (BER) exponent which is a difference between an estimated BER exponent and a configured or specific target BER exponent; or delta modulation coding scheme (MCS) index which is a difference between an estimated MCS value of the received transmission based on a reference, specific or configured BLER or BER and an MCS used for the received transmission, wherein, in selecting the reporting granularity, the processor is configured to select the reporting granularity per code block (CB), per code block group (CBG) or per transport block (TB), and wherein, in selecting the measurement method, the processor is configured to select the measurement method based on:

a BER according to flipped log-likelihood ratio (LLR) values or variances or SINR measurements; or a degree of difficulty in decoding the received transmission.

* * * * *